(12) United States Patent
Staver

(10) Patent No.: US 12,269,390 B1
(45) Date of Patent: Apr. 8, 2025

(54) TAIL LIGHT CONVERTER SYSTEM

(71) Applicant: Michael Lee Staver, Lanesboro, MN (US)

(72) Inventor: Michael Lee Staver, Lanesboro, MN (US)

( * ) Notice: Subject to any disclaimer, the term of this patent is extended or adjusted under 35 U.S.C. 154(b) by 58 days.

(21) Appl. No.: 17/849,160

(22) Filed: Jun. 24, 2022

(51) Int. Cl.
*B60Q 1/00* (2006.01)

(52) U.S. Cl.
CPC .................. *B60Q 1/0017* (2013.01)

(58) Field of Classification Search
CPC .... B60Q 1/0017; B60Q 1/1446; B60Q 1/343; B60Q 1/40; B60Q 1/076; F21V 17/06; F21S 43/195
See application file for complete search history.

(56) References Cited

U.S. PATENT DOCUMENTS

| | | | | |
|---|---|---|---|---|
| 3,670,301 A | * | 6/1972 | Douglas | B60R 25/1001 340/638 |
| 3,804,999 A | * | 4/1974 | Hubbard | H01H 36/0006 303/DIG. 8 |
| 5,682,138 A | * | 10/1997 | Powell | B60Q 1/326 340/475 |
| 2016/0054365 A1 | * | 2/2016 | Cooper | G01R 31/006 324/504 |
| 2016/0207451 A1 | * | 7/2016 | Orazem | B60Q 1/2661 |
| 2017/0045137 A1 | * | 2/2017 | Dufford | B60W 30/18136 |
| 2018/0025345 A1 | * | 1/2018 | Kittoe | G07F 15/00 705/41 |
| 2020/0296779 A1 | * | 9/2020 | Moghe | H04B 3/544 |
| 2021/0309194 A1 | * | 10/2021 | Thomas | B60D 1/26 |

FOREIGN PATENT DOCUMENTS

CN 215497327 U * 1/2022

* cited by examiner

*Primary Examiner* — Abdullah A Riyami
*Assistant Examiner* — Syed M Kaiser

(57) ABSTRACT

The invention pertains to devices used in, but not limited to, vehicle tail light converters. Improvements include: a brake over hazard lighting scheme, durability, light brightness, and an electrical systems separation system.

2 Claims, 5 Drawing Sheets

207 - Control
208 - Control
209 - Electronic Switch
210 - Electronic Switch
211 - Electronic Switch
212 - Electronic Switch
213 - Electronic Switch
214 - Electronic Switch 207 - Control
208 - Control
209 - Electronic Switch
210 - Electronic Switch
211 - Electronic Switch
212 - Electronic Switch
213 - Electronic Switch
214 - Electronic Switch 315 - Electromagnetic Relay
316 - Electromagnetic Relay 410 - Electronic Switch
411 - Electronic Switch 412 - Electronic Switch
413 - Electronic Switch

TAIL LIGHT CONVERTER SYSTEM

TECHNICAL FIELD

This invention relates generally to management of direct current (DC) exterior lighting systems found primarily in vehicles and trailers in the transportation industry, including tail light converters and the like.

BACKGROUND

Much of the content in the current application exists in the following provisional patent applications filed by the current applicant/inventor, U.S. 62/562,426 and 62/445,295, these provisional applications were let to expire.

There are typically two types of lighting scenarios found in tail light systems of vehicles today, vehicles with independent turn/stop lights sometimes referred to as a dual bulb system (DBS) and vehicles with shared turn/stop lights sometimes referred to as a single bulb system (SBS). A vehicle with shared turn/brake lights contains light bulbs where the turn or brake light bulb element is shared by the turn/brake light circuits. This means that the bulb element will either flash on and off under a turn indication, or stay on steady under a brake indication, depending on the signal produced by the vehicle. However, because of the shared element in the SBS, the bulb cannot indicate both turn and stop at the same time. With this type SBS system and when viewed from the rear of the vehicle, with the left turn signal on and brakes applied, the left turn/brake shared bulb would flash on and off indicating a left turn, while the right side turn/brake shared bulb would be on steady indicating braking. In contrast, a vehicle equipped with independent turn/brake lights DBS under the same lighting conditions would have a brake light on each side of the rear of the vehicle, with a separate turn light bulb flashing on the left side.

Many vehicles in the United States are connected to trailers, these trailers certainly under 14,000 lbs gross vehicle weight rating (GVWR), are typically manufactured with single bulb systems SBS described above. Tail light converters are needed to connect a dual bulb system DBS vehicle to a SBS trailer.

Tail light converters (TLCs) have the challenge to provide the same output indications to the trailer lights as they receive from the vehicle. This can be a problem for TLCs converting DBS vehicles to SBS trailers when the vehicle has its hazard lights on with the brakes applied. There are existing systems that will simply keep flashing the trailer indicating hazard lights instead of providing brake light indication when the brakes are applied under that scenario.

Due to safety concerns, TLCs should be constructed with ample durability to provide long service life. In some cases TLCs have failed under normal conditions and in other cases TLCs have failed to separate short circuit and overloads away from vehicle lighting systems, at times opening vehicle fuses causing light problems in both vehicles and trailers.

TLCs can have an additional challenge in providing bright trailer light outputs due to system wide voltage drops including across electronic components and long runs of small sized conductors found in vehicles. This can make fuse opening slow in an overload condition raising current levels system wide.

In view of the above and other disadvantages of existing systems, improvements are desirable.

SUMMARY

In general, the present disclosure relates to improving lighting converters by improving lighting schemes (how the output signals of a TLC resemble its input signals from a vehicle lighting system), trying as close as possible to match the vehicles lighting scheme as seen on the trailer lights while improving light brightness, durability, and protecting vehicle lighting systems. This disclosure contains a brake over hazard lighting scheme. Additionally, some of the new designs herein described are novel however, while the best mode perceived will be the focus of this disclosure, it is not meant to present a holistic use or limit the scope of the invention.

In the current application, the brake over hazard circuit is discussed. It is referenced in the four relay and electronic style TLCs. While this aspect is shown exactly duplicated in the figures and specification, ie; a left side and a right side, it should be understood that the core of the aspect is found in the singularity of either side.

In one aspect, a four relay TLC is disclosed, the invention can indicate brake lights over hazard lights, it provides excellent durability with low voltage drop across the relay contacts. In another aspect, an electronic TLC is described, it can indicate brake light over hazard lights, it can run the trailer lights directly however, it can be designed to drive either of the "add-on" units described below, or be connected to similar electronic switches. In another aspect, a powered two relay style light driver add-on unit is detailed. In another aspect, a powered electronic light driver add on unit is detailed. Both add-on units can be connected to an existing SBS TLC outputs or SBS vehicle direct for improvements in durability, light brightness, and vehicle lighting system protection.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION OF THE INVENTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

For the purpose of clarity and to focus on the invention, a vehicle with a conventional lighting system and a trailer with trailer lights having prescribed voltage supply and ground circuits can be assumed for electrical connection purposes. Connections made to the various circuits, ie: connect to vehicle left turn light voltage supply, would be understood by one of ordinary skill. Additionally, a vehicle positive supply and return line ground to a power source can be supplied by the vehicle and that the grounding system can be a common or system wide ground for both the vehicle and trailer. Chassis grounds can be considered herein.

Figure 1:
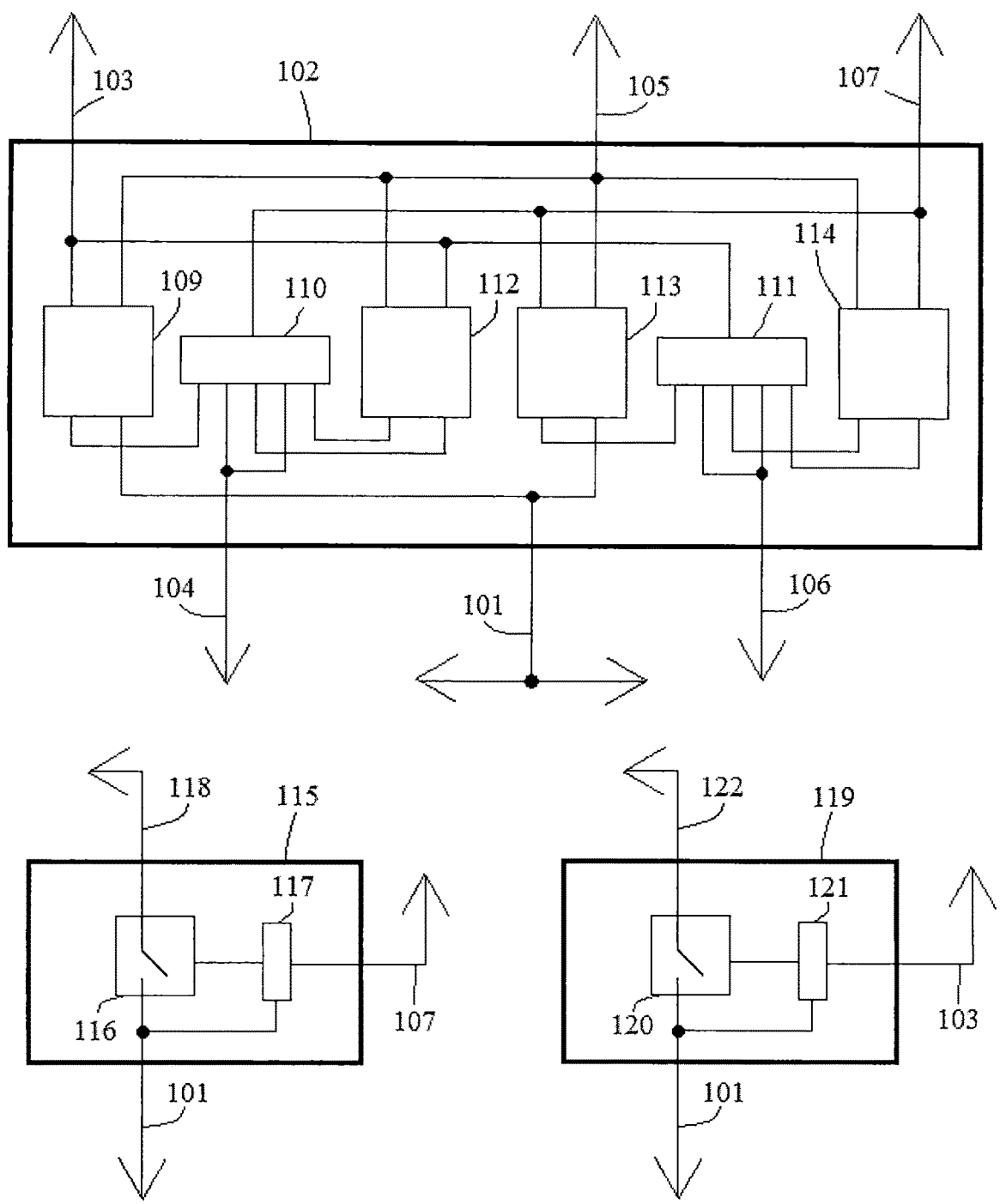
FIG. 1 is a block diagram of an embodiment of a four relay style tail light converter with a brake over hazard lighting scheme.

Referring to FIG. 1 a four relay style tail light converter (TLC) providing brake lights over hazard lights is described. The TLC module 102 contains: four electromagnetic relays, 109, 112, 113, and 114, each relay having at least two switch contact pin connections, each relay configured in the normally closed position in relation to its switch contact pins, with each relay containing an energizing coil having a voltage input terminal connection and a coil output or ground terminal connection; two diode modules, diode module 110 contains three diodes: D2, D3, and D4 each having a cathode and an anode, and diode module 111 contains three diodes: D1, D5, and D6 each having a cathode and an anode; inputs from an existing lighting system from a vehicle, vehicle left turn light voltage supply (vehicle left turn supply) circuit 103, vehicle right turn light voltage supply (vehicle right turn supply) circuit 107, vehicle brake light voltage supply (vehicle brake supply) circuit 105, and a common system ground 101; outputs to lights in a lighting system for a trailer: trailer left turn/brake light voltage supply (trailer left turn/brake supply) circuit 104, trailer right turn/brake light voltage supply (trailer right turn/brake supply) circuit 106, and a system wide common return line or ground 101, is described. Relay 109 first switch contact pin is electrically connected to the vehicle left turn supply circuit 103, relay 109 second switch contact pin is electrically connected to the anode of diode D2 in module 110, relay 109 coil input terminal is electrically connected to the vehicle brake supply circuit 105, and relay 109 coil output terminal is electrically connected to ground 101. Relay 112 first switch contact pin is electrically connected to vehicle brake supply circuit 105, relay 112 second switch contact pin is electrically connected to the anode of diode D3 in module 110, relay 112 coil input pin is electrically connected to vehicle left turn supply circuit 103, and relay 112 coil output pin is electrically connected to the anode of diode D4 in module 110. Diode D2 cathode is electrically connected to the trailer left turn/brake supply circuit 104, diode D3 cathode is electrically connected to trailer left turn/brake supply circuit 104, diode D4 cathode is electrically connected to the opposite side vehicle right turn supply circuit 107. Relay 113 first switch contact pin is electrically connected to the vehicle right turn supply circuit 107, relay 113 second switch contact pin is electrically connected to the anode of diode D5 in module 111, relay 113 coil input terminal is electrically connected to the vehicle brake supply circuit 105, and relay 113 coil output terminal is electrically connected to ground 101. Relay 114 first switch contact pin is electrically connected to vehicle brake supply circuit 105, relay 114 second switch contact pin is electrically connected to the anode of diode D6 in module 111, relay 114 coil input pin is electrically connected to vehicle right turn supply circuit 107, and relay 114 coil output pin is electrically connected to the anode of diode D1 in module 111. Diode D5 cathode is electrically connected to the trailer right turn/brake supply circuit 106, diode D6 cathode is electrically connected to trailer right turn/brake supply circuit 106, diode D1 cathode is electrically connected to the opposite side vehicle left turn supply circuit 103.

The brake over hazard indication, in the four relay style converter, is accomplished largely by exposing relays 112 and 114 coil output pins to the opposite side turn signal supply, providing opposing voltage to the relay coils during opposite turn circuit activation.

The four relay style converter can be connected to a vehicle with conventional incandescent lights. Coil output terminals for relays 112 and 114 are provided a ground connection thru the respective vehicle bulb element. Relays with high energizing coil resistances such as the mini or micro relay series may be good choices.

If adding the four relay TLC to a vehicle with a high resistance/low current lighting system, a high resistance circuit can be added, one to each side. This circuit described below would replace the existing circuits described above from "diode D4 cathode to vehicle right turn supply 107", and prospectively, "diode D1 cathode to vehicle left turn supply 103". High resistance circuit 115 contains an electronic switch 116 and a control 117. Control 117 contains at least a diode D7 having a cathode and an anode. Switch 116 first switch contact is electrically connected to diode D4 cathode circuit 118, the second switch contact of switch 116 is electrically connected to ground 101, the control of switch 116 is electrically connected to ground 101. Diode D7 anode is electrically connected to the vehicle right turn supply circuit 107, diode D7 cathode is electrically connected to the control of switch 116. High resistance circuit 119 contains a switch 120 and a control 121. Control 121 contains at least a diode D8 having a cathode and an anode. Switch 120 first switch contact is electrically connected to diode D1 cathode circuit 122, the second switch contact of switch 120 is electrically connected to ground 101, the control of switch 120 is electrically connected to ground 101. Diode D8 anode is electrically connected to the vehicle left turn supply circuit 103, diode D8 cathode is electrically connected to the control of switch 120.

Figure 2:
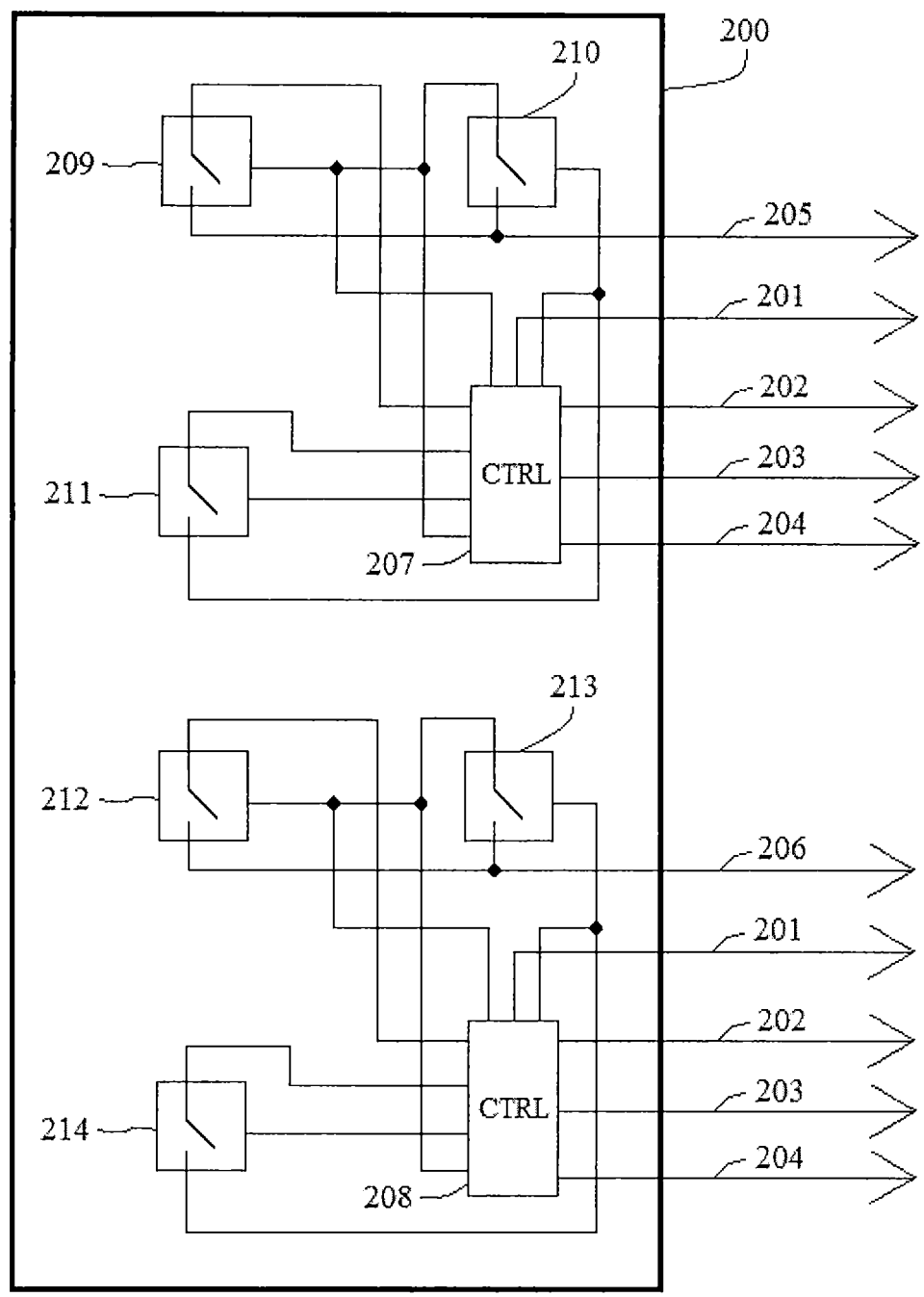
FIG. 2 is a block diagram of an embodiment showing an electronic style light converter with a brake over hazard lighting scheme

Referring to FIG. 2 an electronic TLC Module 200 with brake over hazard lights is provided. TLC 200 contains: six bipolar junction transistors (BJT) electronic switches, 209, 210, 211, 212, 213, and 214, each switch having 2 switch contact pin connections, and a control connection; two controls 207 and 208, control 207 having at least 4 diodes: D1, D2, D3, D7 each diode with a cathode and an anode, control 208 having at least 4 diodes, D4, D5, D6, D8 each diode with a cathode and an anode. The vehicle left turn supply circuit 203 is electrically connected to the anode of diode D1 and the anode of diode D7. The cathode of diode D1 is electrically connected to the first switch contact pin of switch 209. Switch 209 second switch contact is electrically connected to a trailer left turn/brake supply circuit 205, switch 209 control is electrically connected to ground 201. The vehicle brake supply circuit 202 is electrically connected to the anode of diode D2, the cathode of diode D2 is electrically connected to the control of switch 209 and to the first switch contact of switch 210. Switch 210 second switch contact is electrically connected to the trailer left turn/brake supply circuit 205, the control of switch 210 is electrically connected to ground 201. The vehicle right turn supply circuit 204 is electrically connected to the anode of diode D3, the cathode of diode D3 is electrically connected to the control of switch 211. Switch 211 first switch contact is electrically connected to the cathode of diode D7, switch 211 second switch contact is electrically connected to the control of switch 210, the control of switch 211 is electrically connected to ground 201. The vehicle right turn supply circuit 204 is electrically connected to the anode of diode D4 and the anode ode D8. The cathode of diode D4 is electrically connected to a first switch contact pin of switch 212. Switch 212 second switch contact is electrically connected to the trailer right turn/brake supply circuit 206, switch 212 control is electrically connected to ground 201. The vehicle brake supply circuit 202 is electrically connected to the anode of diode D5, the cathode of diode D5 is electrically connected to the control of switch 212 and the first switch contact of switch 213. Switch 213 second switch contact is electrically connected to the trailer right turn/brake supply circuit 206, the control of switch 213 is electrically connected to ground 201. The vehicle left turn supply circuit 203 is electrically connected to the anode of diode D6, the cathode of diode D6 is electrically connected to the control of switch 214. Switch 214 first switch contact is electrically connected to the cathode of diode D8, switch 214 second switch contact is electrically connected to the control of switch 213, the control of switch 214 is electrically connected to ground 201.

To improve efficiency of the load carrying switches 209, 210, 212, and 213, Metal Oxide Semiconductor Field effect transistors (MOSFET) s can be used. The following circuit adapts the MOSFETs switches to TLC 200 by connecting the controls of switch 209 and 212 directly to the brake supply 202, TLC 200 contains: four MOSFET electronic switches, 209, 210, 212, and 213, and two BJT electronic switches 211 and 214 each switch having 2 switch contact pin connections, and a control connection; two controls 207 and 208, control 207 having at least 4 diodes: D1, D2, D3, and D7 each diode with a cathode and an anode, control 208 having at least 4 diodes, D4, D5, D6, and D8 each diode with a cathode and an anode. The vehicle left turn supply circuit 203 is electrically connected to the anode of diode D1. The cathode of diode D1 is electrically connected to the first switch contact pin of switch 209. Switch 209 second switch contact is electrically connected to the trailer left turn/brake supply circuit 205, switch 209 control is electrically connected to ground 201 and switch 209 control is electrically connected to the vehicle brake supply 202. The vehicle brake supply circuit 202 is electrically connected to the anode of diode D2, the cathode of diode D2 is electrically connected to the first switch contact of switch 210. Switch 210 second switch contact is electrically connected to the trailer left turn/brake supply circuit 205, the control of switch 210 is electrically connected to ground 201. The vehicle left turn supply circuit 203 is electrically connected to the anode of diode D7. The cathode of diode D7 is electrically connected to a first switch contact pin of switch 211. Switch 211 second switch contact is electrically connected to the control of switch 210. The control of switch 211 is electrically connected to ground 201. The vehicle right turn supply circuit 204 is electrically connected to the anode of diode D3, the cathode of diode D3 is electrically connected to the control of switch 211. The vehicle right turn supply circuit 204 is electrically connected to the anode of diode D4. The cathode of diode D4 is electrically connected to a first switch contact pin of switch 212. Switch 212 second switch contact is electrically connected to the trailer right turn/brake supply circuit 206, switch 212 control is electrically connected to ground 201 and switch 212 control is electrically connected to the vehicle brake supply 202. The vehicle brake supply circuit 202 is electrically connected to the anode of diode D5, the cathode of diode D5 is electrically connected to the first switch contact of switch 213. Switch 213 second switch contact is electrically connected to the trailer right turn/brake supply circuit 206, the control of switch 213 is electrically connected to ground 201. The vehicle right turn supply circuit 204 is electrically connected to the anode of diode D8. The cathode of diode D8 is electrically connected to a first switch contact pin of switch 214. Switch 214 second switch contact is electrically connected to the control of switch 213. The control of switch 214 is electrically connected to ground 201. The vehicle left turn supply circuit 203 is electrically connected to the anode of diode D6, the cathode of diode D6 is electrically connected to the control of switch 214.

The brake over hazard indication, in the electronic style converter, is accomplished largely by exposing switches 211 and 214 controls to the opposite side turn signal supply.

Figure 3:
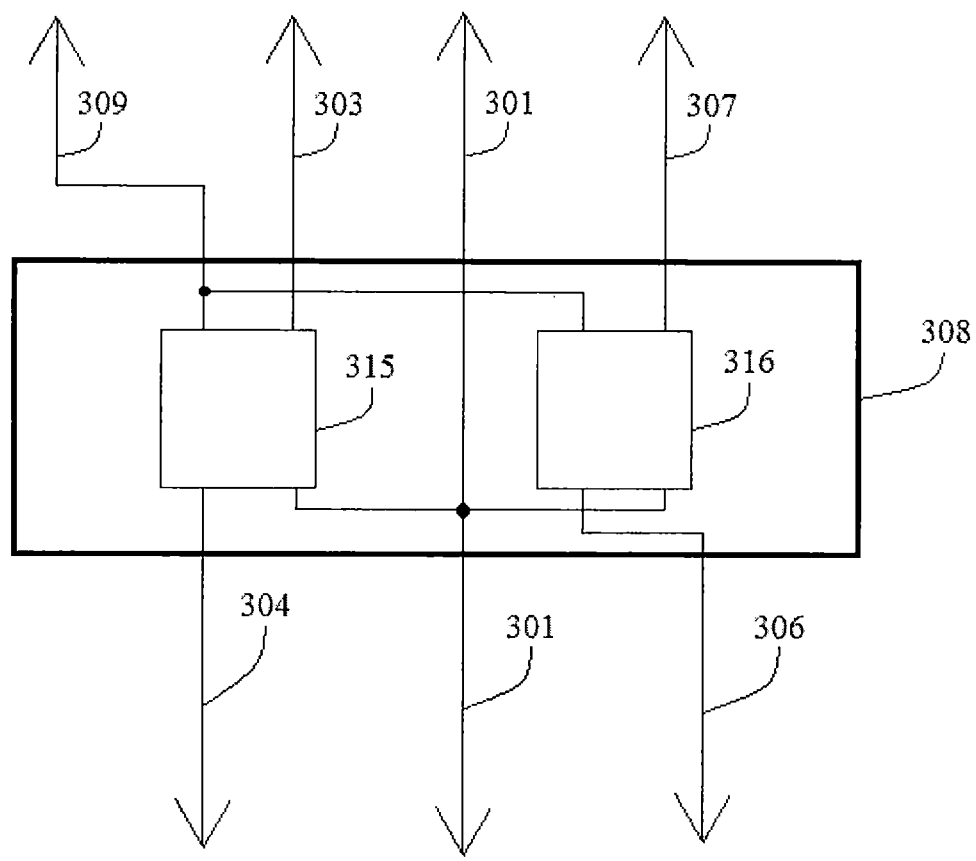
FIG. 3 is a block diagram of an embodiment showing a two relay light driver unit.

Referring to FIG. 3 a powered relay style trailer light driver is shown. The driver module 308 contains two relays, 315 and 316. Each relay having at least two switch contact pin connections, each relay configured in the normally open configuration in relation to its switch contact pins, with each relay containing an energizing coil having a voltage input pin and a voltage output or ground pin connections. Relay 315 first switch contact pin is electrically connected to the vehicle positive supply 309, relay 315 second switch contact pin is electrically connected to the trailer left turn/brake supply circuit 304, relay 315 coil input pin is electrically connected to a vehicle left turn/brake supply 303 (this connection could be made to an existing TLC output or connected vehicle direct if the vehicle or TLC output has a SBS lighting scheme), and relay 315 coil output pin is electrically connected to ground 301. Relay 316 first switch contact pin is electrically connected to a vehicle positive supply 309, relay 316 second switch contact pin is electrically connected to the trailer right turn/brake supply circuit 306, relay 316 coil input pin is electrically connected to a vehicle right turn/brake supply 307 (this connection could be made to an existing TLC output or connected vehicle direct if the vehicle or TLC output has a SBS lighting scheme), and relay 316 coil output pin is electrically connected to ground 301.

Figure 4:
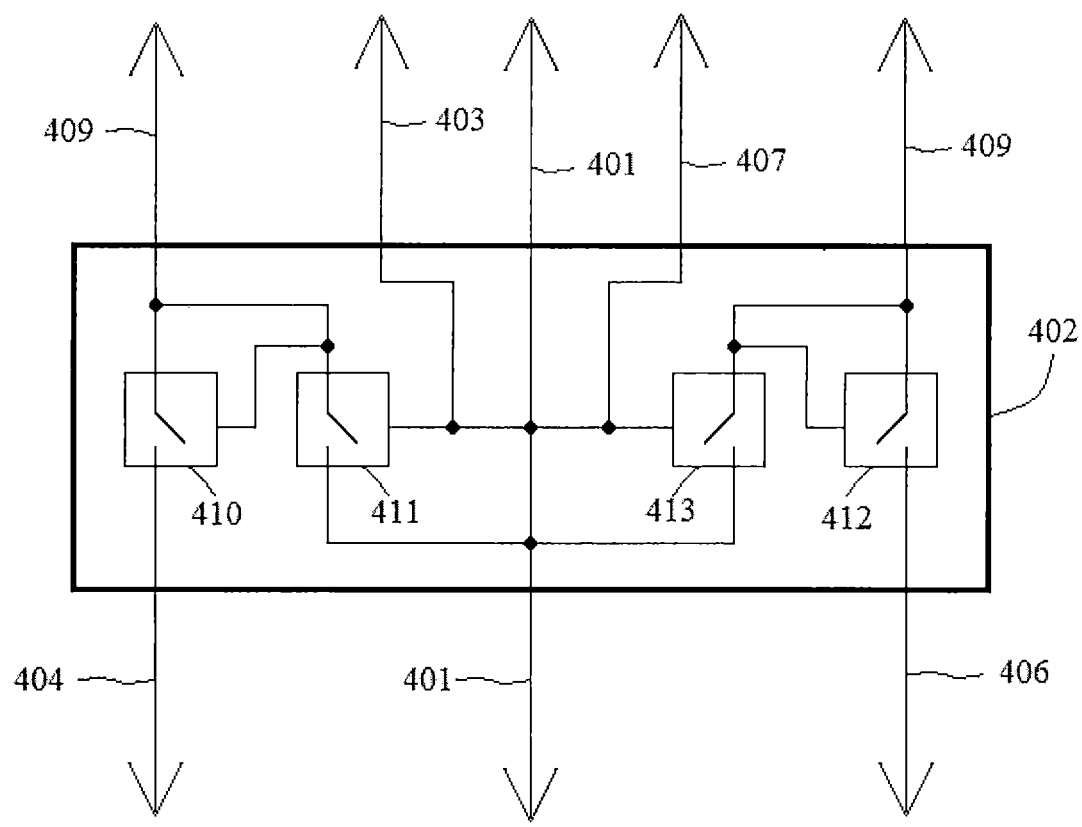
FIG. 4 is a block diagram of an embodiment showing an electronic light driver unit.

Referring to FIG. 4 an electronic style light driver is shown. Light driver module 402 contains at least: four electronic switches 410, 411, 412, and 413 each containing two switch contact terminals and a control. Switch 410 first switch contact pin is electrically connected to a vehicle positive supply 409, switch 410 second switch contact pin is electrically connected to the trailer left turn/brake supply circuit 404, and switch 410 control is electrically connected to a vehicle positive supply 409. Switch 411 first switch contact is electrically connected to switch 410 control, switch 411 second switch contact is electrically connected to ground 401, switch 411 control is electrically connected to ground 401. The vehicle left turn/brake supply 403 is electrically connected to switch 411 control (this connection could be made to an existing TLC output or connected vehicle direct if the vehicle or TLC output has a SBS lighting scheme). Switch 412 first switch contact pin is electrically connected to the vehicle positive supply 409, switch 412 second switch contact pin is electrically connected to the trailer right turn/brake supply circuit 406, and switch 412 control is electrically connected to a vehicle positive supply 409. Switch 413 first switch contact is electrically connected to switch 412 control, switch 413 second switch contact is electrically connected to ground 401, and switch 413 control is electrically connected to ground 401. Vehicle right turn/brake supply 407 is electrically connected to switch 413 control (this could be an existing TLC output or connected vehicle direct if the vehicle or TLC output has a SBS lighting scheme).

Figure 5:
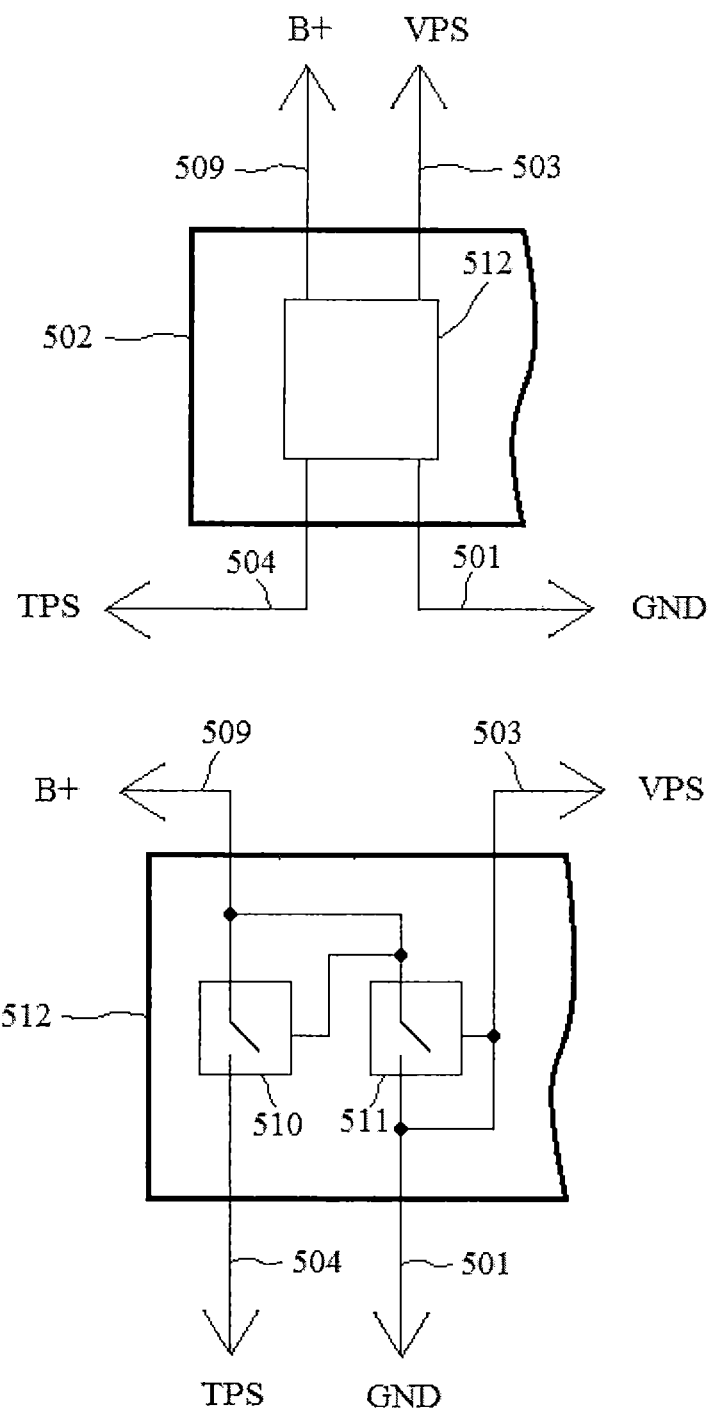
FIG. 5 is a block diagram of an embodiment showing connectivity of additional lighting circuits ie; parking lights, reverse backup lights, etc, inclusive to the figures above.

Referring to FIG. 5 connecting additional lighting circuits ie: park lights, reverse backup lights etc. . . . is provided. A parking lamp circuit connection is shown. TLC module 502 contains a relay 512 having at least two switch contact pin connections, the relay is configured in the normally open configuration in relation to its switch contact pins, with the relay containing an energizing coil having a voltage input pin and a voltage output or ground pin connections. Relay 512 first switch contact pin is electrically connected to a vehicle positive supply 509, relay 512 second switch contact pin is electrically connected to the trailer park supply circuit 504, relay 512 coil input pin is electrically connected to a vehicle park supply 503 (this could be an existing TLC output or connected vehicle direct), and relay 512 coil output pin is electrically connected to ground 501. An electronic unit is provided: A parking lamp circuit connection is shown. TLC module 508 contains two electronic switches each switch having two switch contact terminals and a control. Switch 510 first switch contact pin is electrically connected to a vehicle positive supply 509, switch 510 second switch contact pin is electrically connected to the trailer park supply circuit 504, and switch 510 control is electrically connected to the vehicle positive supply 509. Switch 511 first switch contact is electrically connected to the control of switch 510, switch 511 second switch contact is electrically connected to ground 501, and switch 511 control is electrically connected to ground 501. Vehicle park supply circuit 503 is electrically connected to switch 511 control (this could be an existing TLC output or connected vehicle direct).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A tail light converter configured to operate the lights of a trailer using input signals supplied by lighting circuits of a towing vehicle to provide outputs to the trailer lights:
 a tail light converter circuit comprising;
  a first electromagnetic relay having:
   normally closed switch contacts comprising two switch contact terminals, and an energizing coil comprising an input terminal and ground terminal connections, wherein the first electromagnetic relay having a first switch contact is electrically connected to a side of the towing vehicle turn supply circuit; the first electromagnetic relay having a second switch contact is electrically connected to the corresponding trailer turn/brake supply circuit; the coil input terminal of the first electromagnetic relay is electrically connected to a vehicle brake supply circuit; the coil output terminal of the first electromagnetic relay is electrically connected to ground;
  a second electromagnetic relay having:
   normally closed switch contacts comprising two switch contact terminals, and an energizing coil having an input terminal and ground terminal connections, wherein the second electromagnetic relay having a first switch contact is electrically connected to the vehicle brake supply circuit; the second electromagnetic relay having a second switch contact is electrically connected to the trailer turn/brake supply circuit corresponding to the first electromagnetic relay second switch contact; the coil input terminal of the second electromagnetic relay is electrically connected to the vehicle turn supply circuit corresponding with the first electromagnetic relay first switch contact; the coil output terminal of the second electromagnetic relay is electrically connected to the opposite side vehicle turn supply circuit; and
  a high resistance system circuit comprising:
  an electronic switch including: two switch contacts and a control, wherein the electronic switch having a first switch contact is electrically connected to the coil output of the second electromagnetic relay; the electronic switch having a second switch contact is electrically connected to the ground; the electronic switch control is electrically connected to the ground; the electronic switch control is electrically connected to the opposite side of the vehicle turn supply.

2. A tail light converter configured to operate the lights of a trailer using input signals supplied by lighting circuits of a towing vehicle to provide outputs to the trailer lights:
 a tail light converter circuit comprising:
  a first electronic switch including:
   two switch contacts and a control, wherein the first electronic switch having a first switch contact is electrically connected to a vehicle turn/brake supply; the electronic switch having a second switch contact is electrically connected to the corresponding trailer turn/brake supply; the control of the first switch is electrically connected to ground; the control of the first switch is electrically connected to the vehicle brake supply;
  a second electronic switch including:
  two switch contacts and a control, wherein the second electronic switch (2) having a first switch contact is electrically connected to the control of the first electronic switch; the second electronic switch having a second switch contact is electrically connected to the corresponding trailer turn/brake supply; the second electronic switch control is electrically connected to the ground;
  a third electronic switch including:
  two switch contacts and a control, wherein the third electronic switch having a first switch contact is electrically connected to the vehicle turn supply; the third electronic switch having a second switch contact is electrically connected to the control of the second electronic switch; the control of the third electronic switch is electrically connected to the ground; the control of the third electronic switch is electrically connected to the opposite side vehicle turn supply.

\* \* \* \* \*